(12) United States Patent
Liang et al.

(10) Patent No.: US 12,191,530 B2
(45) Date of Patent: Jan. 7, 2025

(54) ENERGY-STORAGE DEVICE, ELECTRICAL APPARATUS, AND WINDING METHOD

(71) Applicants: Shenzhen Hithium Energy Storage Technology Co., Ltd., Guangdong (CN); Xiamen Hithium Energy Storage Technology Co., Ltd., Fujian (CN)

(72) Inventors: Jinyun Liang, Guangdong (CN); Liangliang Zhang, Guangdong (CN); Wancai Zhang, Guangdong (CN); Ming Yang, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/388,480

(22) Filed: Nov. 9, 2023

(65) Prior Publication Data

US 2024/0162577 A1 May 16, 2024

(30) Foreign Application Priority Data

Nov. 11, 2022 (CN) .......................... 202211416113.0

(51) Int. Cl.
*H01M 50/533* (2021.01)
*H01M 10/0587* (2010.01)
(Continued)

(52) U.S. Cl.
CPC ..... *H01M 50/533* (2021.01); *H01M 10/0587* (2013.01); *H01M 50/103* (2021.01);
(Continued)

(58) Field of Classification Search
CPC ........... H01M 50/533; H01M 10/0587; H01M 50/103; H01M 50/15; H01M 50/536
See application file for complete search history.

(56) References Cited

U.S. PATENT DOCUMENTS

| | | | |
|---|---|---|---|
| 2018/0277902 A1 | 9/2018 | Jin et al. | |
| 2021/0399387 A1* | 12/2021 | Huang | H01M 50/211 |
| 2023/0216077 A1* | 7/2023 | Wen | H01M 10/052 |
| | | | 429/209 |

FOREIGN PATENT DOCUMENTS

| | | |
|---|---|---|
| CN | 102916226 A | 2/2013 |
| CN | 206432322 U | 8/2017 |

(Continued)

OTHER PUBLICATIONS

CNIPA, First Office Action for Chinese Patent Application No. 202211416113.0, Dec. 19, 2022, 16 pages.
(Continued)

*Primary Examiner* — Matthew T Martin
*Assistant Examiner* — Grace Ann Kenlaw
(74) *Attorney, Agent, or Firm* — IP SPRING

(57) ABSTRACT

An energy-storage device, an electrical apparatus, and a winding method are provided in the disclosure. The energy-storage device includes an electrode and a separator, where the electrode and the separator are stacked and wound to form a cell. The electrode is connected with a tab at an end of the electrode in a width direction of the electrode, where the tab includes a first tab and at least one second tab. The first tab is positioned adjacent to an end of the electrode in a length direction of the electrode, and the first tab defines a U-shaped notch. The U-shaped notch is configured to indicate a winding end position of the electrode, facilitating identification and winding automation.

14 Claims, 11 Drawing Sheets

(51) Int. Cl.
  *H01M 50/103* (2021.01)
  *H01M 50/15* (2021.01)
  *H01M 50/536* (2021.01)
  *H01M 10/052* (2010.01)

(52) U.S. Cl.
  CPC ......... *H01M 50/15* (2021.01); *H01M 50/536* (2021.01); *H01M 10/052* (2013.01)

(56) References Cited

FOREIGN PATENT DOCUMENTS

| | | |
|---|---|---|
| CN | 210325964 U | 4/2020 |
| CN | 211045577 U * | 7/2020 |
| CN | 111755657 A | 10/2020 |
| CN | 212277290 U | 1/2021 |
| CN | 112740455 A | 4/2021 |
| CN | 216450703 U | 5/2022 |
| CN | 216698666 U | 6/2022 |
| CN | 114766066 A | 7/2022 |
| CN | 217134453 U | 8/2022 |
| CN | 115332611 A | 11/2022 |
| JP | 2005122940 A | 5/2005 |
| JP | 2010146872 A | 7/2010 |
| JP | 2015130370 A | 7/2015 |
| KR | 2008037197 A * | 4/2008 |
| KR | 20170088617 A | 8/2017 |
| WO | 2021255238 A1 | 12/2021 |

OTHER PUBLICATIONS

CNIPA, Decision of Rejection for Chinese Patent Application No. 202211416113.0, Feb. 5, 2023, 23 pages.

CNIPA, Notice of Allowance for Chinese Patent Application No. 202211416113.0, Sep. 1, 2023, 9 pages.

CNIPA, International Search Report and Written Opinion for International Application No. PCT/CN2022/131549, Jul. 23, 2023, 18 pages.

* cited by examiner

ENERGY-STORAGE DEVICE, ELECTRICAL APPARATUS, AND WINDING METHOD

CROSS-REFERENCE TO RELATED APPLICATION(S)

This application claims priority under 35 U.S.C. § 119(a) to Chinese Patent Application No. 202211416113.0, filed Nov. 11, 2022, the entire disclosure of which is incorporated herein by reference.

TECHNICAL FIELD

This disclosure relates to the field of energy storage, and in particular, to an energy-storage device, an electrical apparatus, and a winding method.

BACKGROUND

During production of lithium batteries, positive electrodes, separators, and negative electrodes need to be stacked and wound to form roll cores, and two or more roll cores are coupled in series or in parallel to form cells. At present, during production of lithium batteries, a winding end position needs to be determined manually during cell winding, resulting in that winding automation cannot be realized.

SUMMARY

In view of above, an energy-storage device, an electrical apparatus, and a winding method are provided in the disclosure.

An energy-storage device is provided in a first aspect of the disclosure. The energy-storage device includes an electrode and a separator, where the electrode and the separator are stacked and wound to form a cell. The electrode is connected with a tab at an end of the electrode in a width direction of the electrode, where the tab includes a first tab and a second tab. The first tab is positioned adjacent to an end of the electrode in a length direction of the electrode, and the first tab defines a U-shaped notch.

An electrical apparatus is provided in a second aspect of the disclosure. The electrical apparatus includes at least one energy-storage device mentioned above, where the energy-storage device is configured to power the electrical apparatus.

A winding method is provided in a third aspect of the disclosure. The winding method is for manufacturing the energy-storage device in the first aspect and begins with operations at step 1. At step 1, the electrode and the separator stacked with the electrode are placed in a winding machine, and the electrode and the separator are wound by the winding machine. At step 2, a sensor of the winding machine senses the U-shaped notch of the first tab and a position of the first tab is determined. At step 3, the electrode is cut at a position close to the first tab in the length direction of the electrode to end winding.

BRIEF DESCRIPTION OF THE DRAWINGS

In order to describe technical solutions of implementations of the disclosure more clearly, the following will give a brief introduction to accompanying drawings used for describing the implementations. Obviously, the accompanying drawings hereinafter described are some implementations of the disclosure. Based on these drawings, those of ordinary skill in the art can also obtain other drawings without creative effort.

Figure 1:
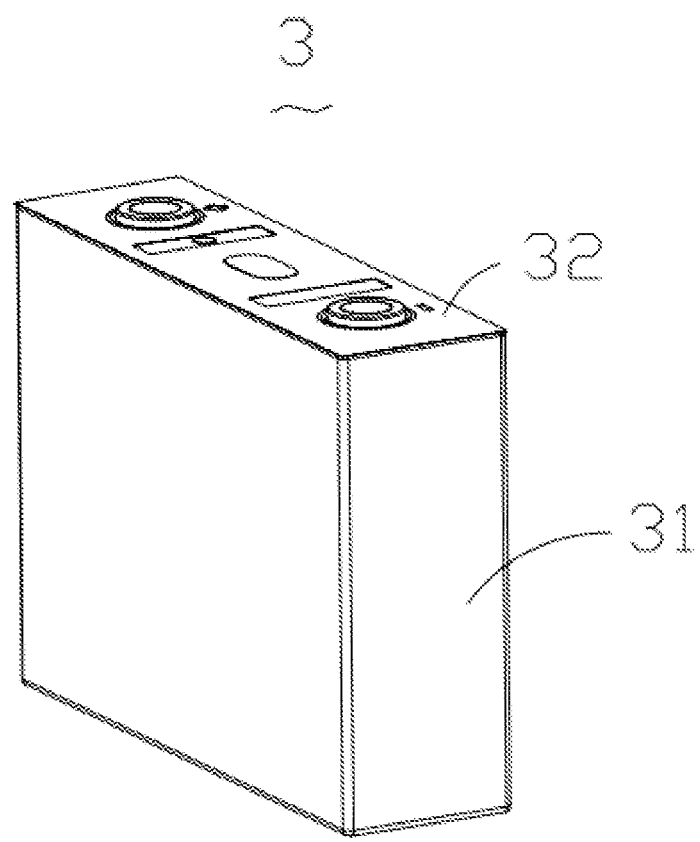
FIG. 1 is a schematic isometric view of a battery in an implementation of the disclosure.

Reference signs of the accompanying drawings: battery 3; cell assembly 2; cell 1; housing 31; cover 32; electrode 10; tab 11; tab root 110; first tab 13; second tab 12; length direction L; width direction W; thickness direction T; U-shaped notch 130; first end 131; internal side wall 1301; first fillet 1303; serrated notch 135; wave notch 132; square wave notch 133; bevel notch 134; adaptor piece 320; welding zone 3201.

DETAILED DESCRIPTION

The following will illustrate clearly and completely technical solutions of implementations of the disclosure with reference to accompanying drawings of implementations of the disclosure. Implementations described herein are merely some implementations, rather than all implementations, of the disclosure. Based on the implementations of the disclosure, all other implementations obtained by those of ordinary skill in the art without creative effort shall fall within a protection scope of the disclosure.

Unless otherwise defined, all technical and scientific terms used herein have the same meaning as commonly understood by those skilled in the art of the present disclosure. The terms used herein in the disclosure are for the purpose of describing implementations only and are not intended to limit the disclosure.

The terms "first", "second", and the like used in the specification, the claims, and the accompany drawings of the disclosure are used to distinguish different objects rather than describe a particular order. The words "one", "a", "the", and similar words used in the disclosure do not indicate a numerical limitation but are only used to indicate existence of at least one. The words "includes", "contains", and similar words are intended to mean that an element or object preceding the word covers an element, object, or the equivalent appearing after the word, without excluding other elements or objects. The words "connected", "coupled", or similar words are not limited to physical or mechanical connections and may include electrical connections, whether direct or indirect.

The reference terms "an implementation", "a specific implementation", "an embodiment", or the like described herein mean that a particular feature, structure, material, or characteristic described in conjunction with the implementations or embodiments may be contained in at least one implementation or embodiment of the disclosure. The exemplary expressions of the above terms appearing in the specification does not necessarily refer to the same implementation or embodiment. Furthermore, the particular feature, structure, material, or characteristic described may be properly combined in any one or more implementations or embodiments.

An energy-storage device in the disclosure may be a battery, or may also be battery modules including batteries, a battery pack, a battery cluster, or other devices with an electricity-energy storage function. For example, a battery 3 illustrated in FIG. 1 will be described as follows.

Figure 2:
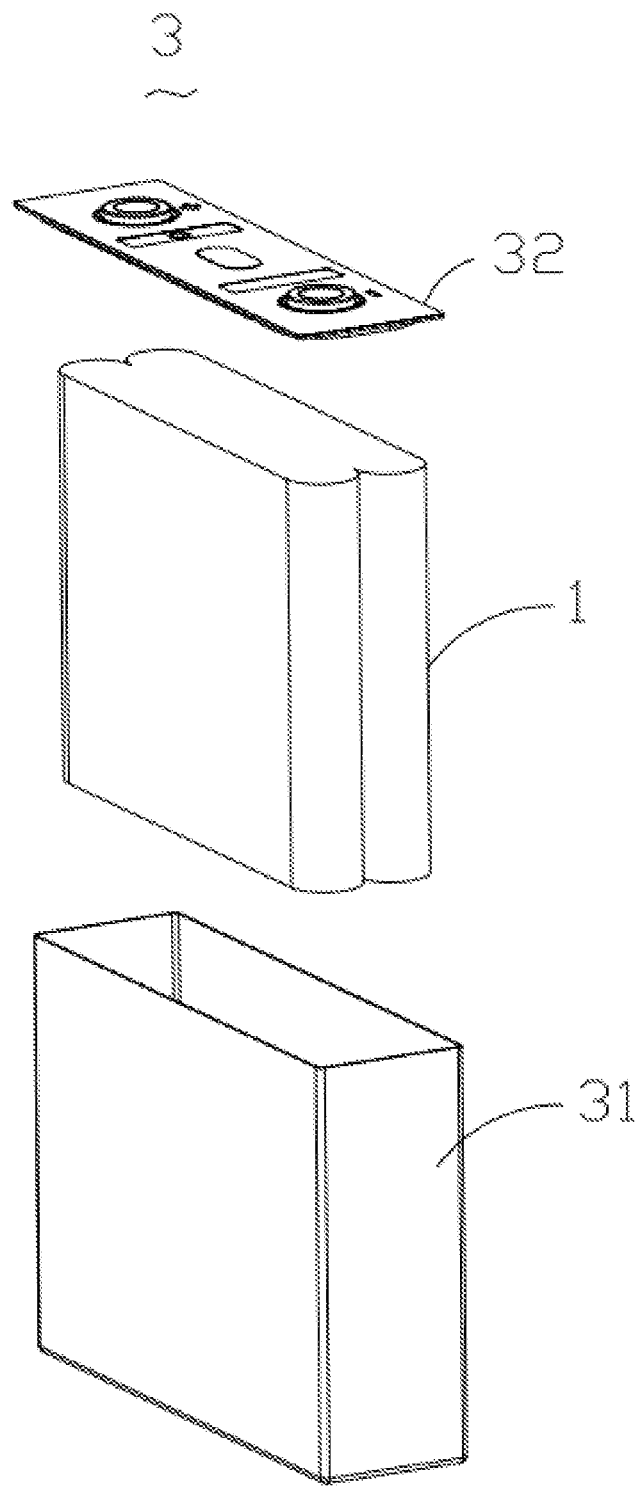
FIG. 2 is a schematic disassembly view of the battery illustrated in FIG. 1.
Figure 3:
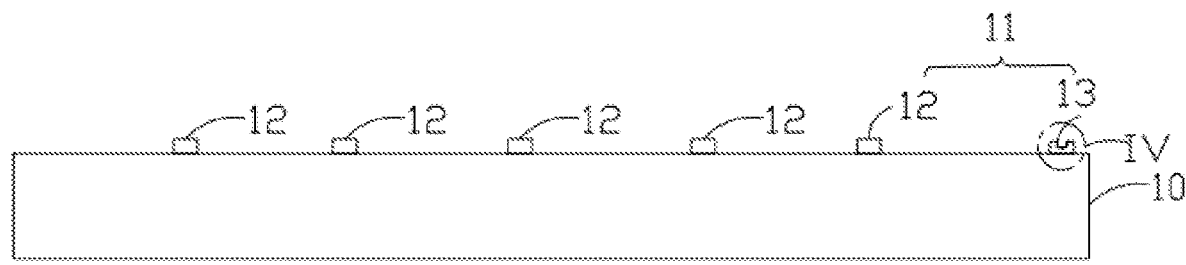
FIG. 3 is a schematic structural diagram illustrating an electrode in a first implementation of the disclosure.
Figure 4:
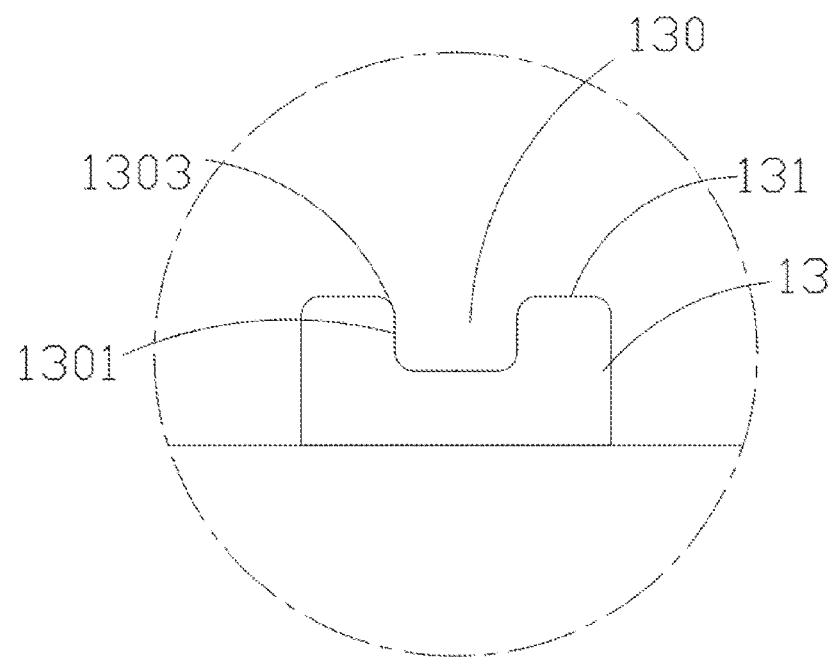
FIG. 4 is a schematic enlarged view of IV part of the electrode illustrated in FIG. 3.

As illustrated in FIG. 2, the battery 3 includes a cell 1, a housing 31, and a cover 32. The cell 1 is formed by winding an electrode 10 illustrated in FIG. 3 and a separator stacked with the electrode 10. As illustrated in FIG. 3, the electrode 10 is connected with a tab 11 at an end of the electrode 10 in a width direction W of the electrode 10, where the tab 11 includes a first tab 13 and a second tab 12. The first tab 13 is positioned adjacent to an end of the electrode 10 in a length direction L of the electrode 10. As illustrated in FIG. 4, the first tab 13 defines a U-shaped notch 130.

It can be understood that, the end of the electrode 10 in the length direction L of the electrode 10 is denoted as a winding end position of the electrode 10 during winding. The winding end position of the electrode 10 can be determined through the U-shaped notch 130 of the first tab 13 during winding to execute corresponding control operations, thereby realizing winding automation.

For convenience of subsequent depiction, the width direction W and the length direction L are defined. As illustrated in FIG. 3, the electrode 10 is in a long strip shape and has a length excessively longer than a width of the electrode 10. The width direction W is a width direction of the electrode 10, and the length direction L is a length direction of the electrode 10.

It can be understood that, the first tab 13 being positioned adjacent to the end of the electrode 10 in the length direction L of the electrode 10 means that a distance between the first tab 13 and the end of the electrode 10 in the length direction L of the electrode 10 is shorter than a preset distance. When the U-shaped notch 130 of the first tab 13 is recognized, a corresponding control instruction may be generated, and the electrode 10 is cut in response to the control instruction, to obtain the cell 1. Thus it is unnecessary to determine manually the winding end position, thereby realizing winding automation.

In an implementation, as illustrated FIG. 4, the first tab 13 has a first end 131 away from the electrode 10, and the U-shaped notch 130 extends from the first end 131 toward the electrode 10. The U-shaped notch 130 has a width extending in the length direction L of the electrode 10 and a depth extending in the width direction W of the electrode 10, where a ratio of the width to the depth of the U-shaped notch 130 is greater than 1.5 and less than 2.

It is easier for the U-shaped notch 130 to extend in a direction of the depth of the U-shaped notch 130 than in a direction of the width of the U-shaped notch 130, and therefore the ratio of the width to the depth of the U-shaped notch 130 is limited to be greater than 1.5 and less than 2 in the disclosure. Thus it is convenient to define the U-shaped notch 130 on the first tab 13, and it is possible to avoid an excessively great depth of the U-shaped notch 130 that causes insufficient spaces on the first tab 13 to be cut.

In an implementation, in the width direction W of the electrode 10, the first tab 13 has a width less than a width of the second tab 12, a ratio of the width of the first tab 13 to the width of the second tab 12 is greater than 0.5 and less than 1, and a difference between the width of the first tab 13 and the width of the second tab 12 is greater than or equal to 2 mm.

According to the above arrangement, overall identification of the first tab 13 is further improved, and recognition readiness of a recognition apparatus for the first tab 13 is further improved during winding of the electrode 10, thus it is possible to further improve a qualification rate of the cell 1 that is formed by winding the electrode 10, thereby greatly improving production benefits.

In an implementation, the first tab 13 has a first fillet 1303 connected between an internal side wall 1301 of the U-shaped notch 130 and the first end 131. A ratio of a radius of the first fillet 1303 to the width of the U-shaped notch 130 is greater than 0.15 and less than 0.2, and a ratio of the radius of the first fillet 1303 to the depth of the U-shaped notch 130 is greater than 0.05 and less than 0.15.

According to arrangement of the first fillet 1303, the U-shaped notch 130 is more convenient to be processed and is not prone to burrs. The electrode 10 is wound to form the cell 1, and a possibility of falling metal particles from the first tab 13 is greatly reduced, thus it is possible to prevent metal particles from falling into the cell 1 to cause a short circuit, and prevent burrs from piercing an encapsulation film of the battery to cause liquid leakage.

Figure 5:
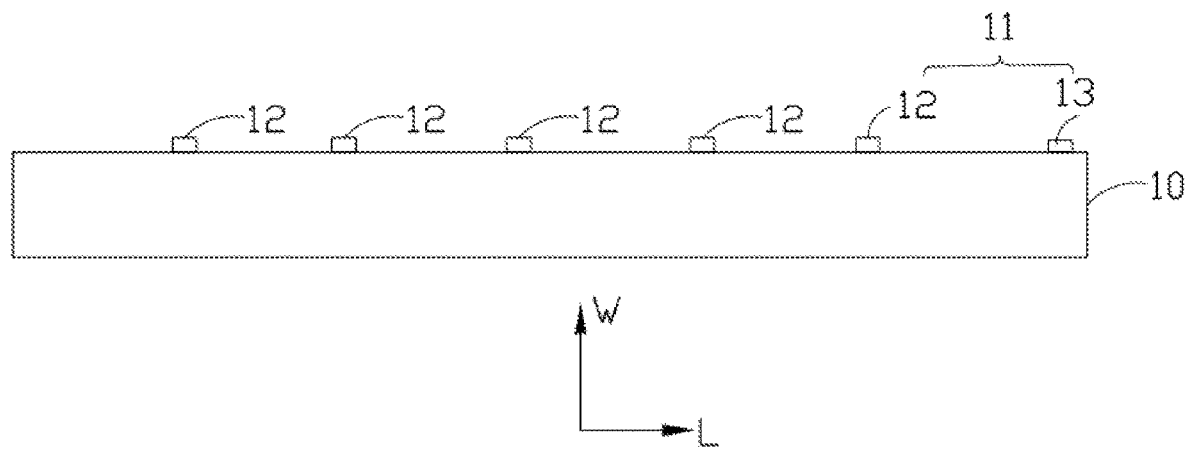
FIG. 5 is a schematic structural diagram illustrating a first tab in a second implementation of the disclosure.

FIG. 5 illustrates a schematic structural diagram illustrating a first tab in a second implementation of the disclosure. In the second implementation, the U-shaped notch 130 of the first tab 13 is omitted, in the width direction W of the electrode 10, the first tab 13 has a width less than a width of the second tab 12, a ratio of the width of the first tab 13 to the width of the second tab 12 is greater than 0.5 and less than 1, and a difference between the width of the first tab 13 and the width of the second tab 12 is greater than or equal to 2 mm. As such, processing of the first tab 13 can be further simplified. Since the width of the first tab 13 is less than the width of the second tab 12, the ratio of the width of the first tab 13 to the width of the second tab 12 is greater than 0.5 and less than 1, and the difference between the width of the first tab 13 and the width of the second tab 12 is greater than or equal to 2 mm, the first tab 13 still has certain identification accuracy, and production of the first tab 13 can be simplified.

It can be understood that, in other implementations, the width of the first tab 13 being less than the width of the second tab 12, the ratio of the width of the first tab 13 to the width of the second tab 12 being greater than 0.5 and less than 1, and the difference between the width of the first tab 13 and the width of the second tab 12 being greater than or equal to 2 mm can be omitted, only the U-shaped notch 130 of the first tab 13 is retained, but the first tab 13 still has certain identification accuracy.

As for specifically practical implementation processes, a type of the first tab 13 may be chosen according to actual production needs.

Figure 6:
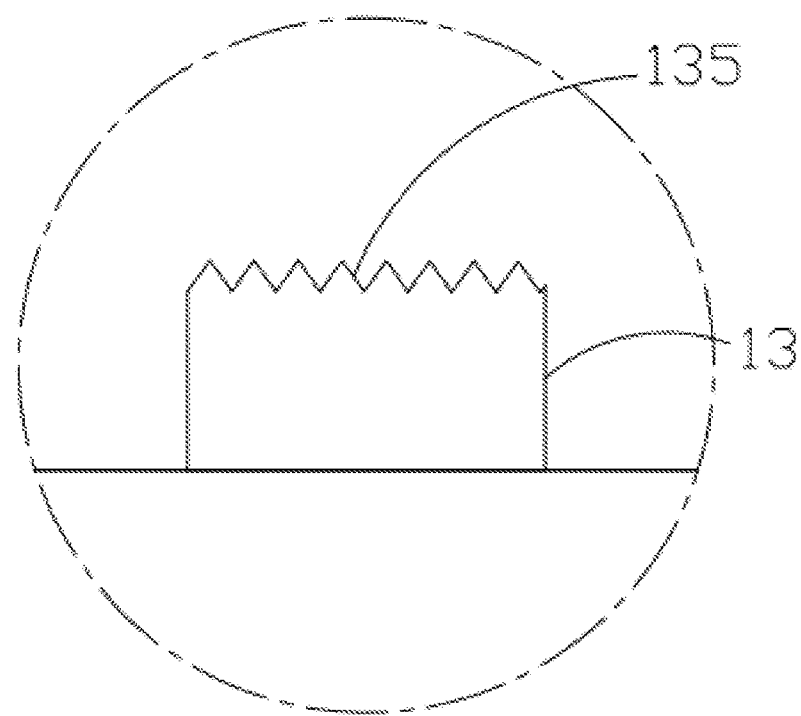
FIG. 6 is a schematic structural diagram illustrating a first tab in a third implementation of the disclosure.

FIG. 6 illustrates a schematic structural diagram illustrating a first tab in a third implementation of the disclosure. Unlike the U-shaped notch 130 in the first implementation, the first tab 13 defines a serrated notch 135 in the third implementation. It can be understood that, the serrated notch 135 has strong identification to enable the first tab 13 to be clearly distinguished from the second tab 12, thereby greatly improving identification accuracy.

Figure 7:
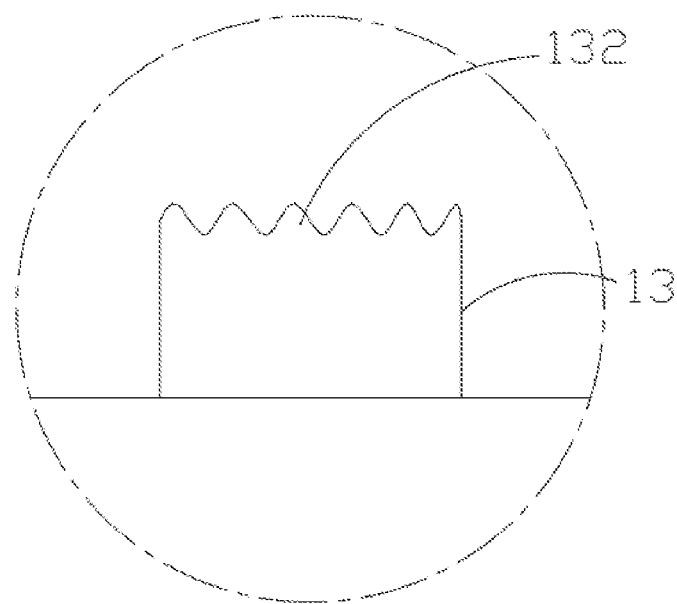
FIG. 7 is a schematic structural diagram illustrating a first tab in a fourth implementation of the disclosure.

FIG. 7 illustrates a schematic structural diagram illustrating a first tab in a fourth implementation of the disclosure. Unlike the U-shaped notch 130 in the first implementation, the first tab 13 defines a wave notch 132 in the fourth implementation. It can be understood that, the wave notch 132 also has strong identification to enable the first tab 13 to be clearly distinguished from the second tab 12, and the wave notch 132 is easy and simple to be processed, thus it is possible to improve identification accuracy and is convenient to process the first tab 13 through the wave notch 132.

Figure 8:
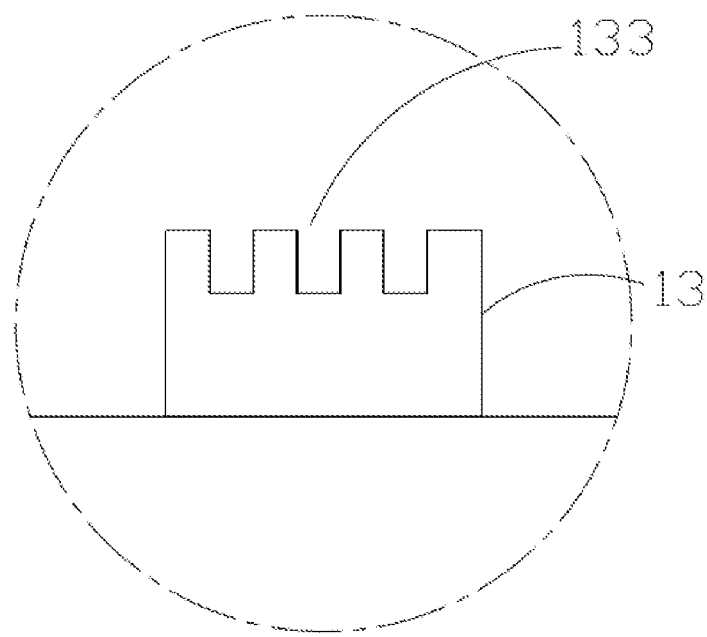
FIG. 8 is a schematic structural diagram illustrating a first tab in a fifth implementation of the disclosure.

FIG. 8 illustrates a schematic structural diagram illustrating a first tab in a fifth implementation of the disclosure. Unlike the U-shaped notch 130 in the first implementation, the first tab 13 defines a square wave notch 133 in the fifth implementation. It can be understood that the square wave notch 133 also has strong identification to enable the first tab 13 to be clearly distinguished from the second tab 12, and the square wave notch 133 is easy and simple to be processed, thus it is possible to improve identification accuracy and is convenient to process the first tab 13 through the square wave notch 133.

Figure 9:
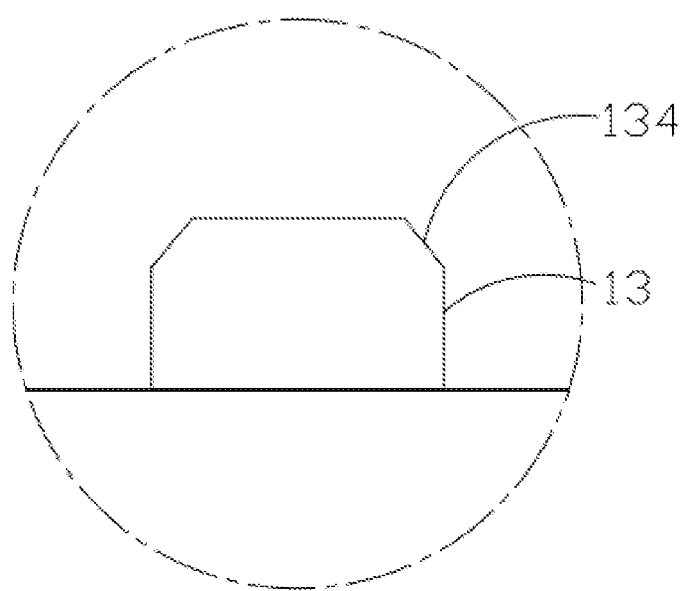
FIG. 9 is a schematic structural diagram illustrating a first tab in a sixth implementation of the disclosure.

FIG. 9 illustrates a schematic structural diagram illustrating a first tab in a sixth implementation of the disclosure. Unlike the U-shaped notch 130 in the first implementation, in the fifth implementation, the first tab 13 defines a bevel notch 134 at an end. It can be understood that the bevel notch 134 also has strong identification to enable the first tab 13 to be clearly distinguished from the second tab 12, and the bevel notch 134 is easy and simple to be processed, thus it is possible to improve identification accuracy and is convenient to process the first tab 13 through the bevel notch 134.

It can be understood that, unlike the U-shaped notch 130 in the first implementation, the first tab 13 may also define a semi-circular notch, or the like, in other implementations.

It can be understood that, unlike the U-shaped notch 130 in the first implementation, the first tab 13 may also define one of an injection-molded serrated notch, a wave notch, a square wave notch, or a semi-circular notch or a combination thereof, in other implementations.

It can be understood that, unlike the U-shaped notch 130 in the first implementation, the first tab 13 is provided with an indentation with identification information in other implementations, where the identification information may be, but is not limited to, one of a square pattern, an oval pattern, a heart-shaped pattern, a trapezoidal pattern, or a specific pattern or a combination thereof.

The first tab 13 is provided with the indentation with the identification information, so that no metal particle falls and no burr is generated during processing of the first tab 13, thus it is possible to avoid lots of secondary hazards and greatly improve a safety factor. Furthermore, the indentation on the first tab 13 enables that an apparatus is able to determine automatically a winding end position, thereby realizing winding automation.

It can be understood that, unlike the U-shaped notch 130 in the first implementation, the first tab 13 is provided with an adhesive member with identification information in other implementations, where the identification information may be, but is not limited to, one of a square pattern, an oval pattern, a heart-shaped pattern, a trapezoidal pattern, or a specific pattern or a combination thereof, or one of a specific number, a word, or the like or a combination thereof.

When striking adhesive members are used, identification of the first tab 13 can be greatly improved, and it is unnecessary to process the first tab 13 to make the first tab 13 have a cut. The first tab 13 has a stronger structural strength, and thus no breakage occurs in subsequent operations of tab welding. As such, the adhesive member can protect the first tab 13 from secondary hazards, and can also be functioned as the winding end position, thereby realizing winding automation.

It can be understood that, unlike the U-shaped notch 130 in the first implementation, the first tab 13 is provided with a coating pattern or printing pattern with identification information in other implementations, where the identification information may be, but is not limited to, one of a square pattern, an oval pattern, a heart-shaped pattern, a trapezoidal pattern, or a specific pattern or a combination thereof, or one of a specific number, a word, or the like or a combination thereof.

When striking coating patterns or printing patterns are used, identification of the first tab 13 can be greatly improved, and it is unnecessary to process the first tab 13 to make the first tab 13 have a cut. The first tab 13 has a stronger structural strength, and thus no breakage occurs in subsequent operations of tab welding. As such, the coating pattern or printing pattern can protect the first tab 13 from secondary hazards, and can also be functioned as the winding end position, thereby realizing winding automation.

It can be understood that, unlike the U-shaped notch 130 in the first implementation, the first tab 13 defines at least one identification hole arranged at intervals in other implementations. In the implementation, the identification hole is in a circular shape. It can be understood that, in other implementations, the identification hole is in a shape of one or more of square, oval, heart, trapezoid, or a hollow pattern. In an implementation, the identification hole needs to be spaced at a preset distance from a welding zone of the tab 11, thereby preventing the first tab 13 from being broken during welding due to the U-shaped notch defined on the first tab 13. In an implementation, the preset distance is greater than 0.5 mm.

A winding end position of the cell 1 can be identified as the identification hole, thus it is unnecessary to determine manually the winding end position, thereby realizing winding automation.

Figure 10:
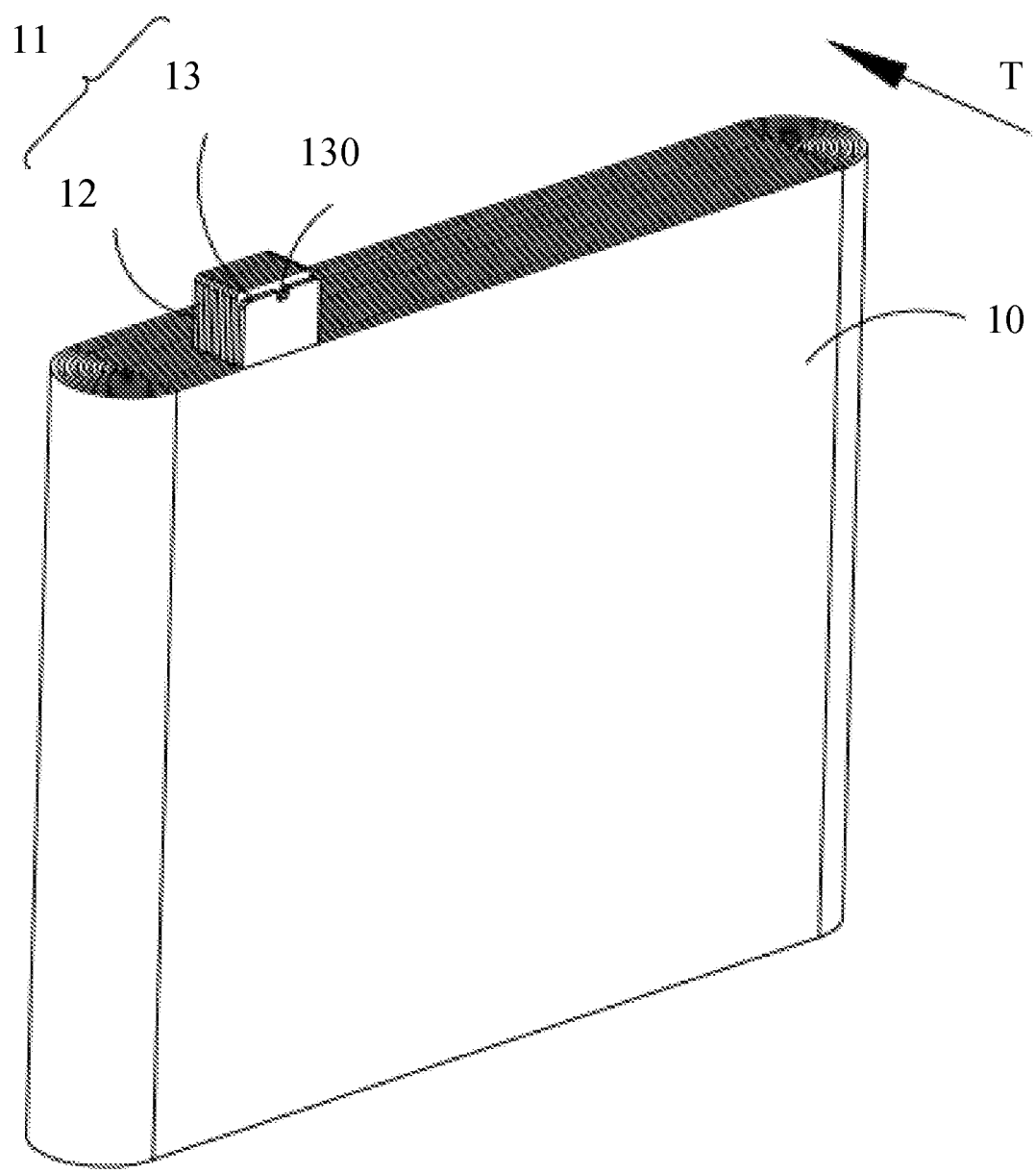
FIG. 10 is a schematic structural diagram illustrating the electrode illustrated in FIG. 3 after winding.

It can be understood that, in some optional implementations, a feature on the first tab 13 functioning in identification includes, but is not limited to, one of: one of the U-shaped notch 130, the serrated notch 135, the wave notch 132, the square wave notch 133, or the bevel notch 134 or a combination thereof, the indentation with the identification information, the adhesive member with the identification information, the coating pattern or printing pattern with the identification information, the identification hole, or the width of the first tab 13 being less than the width of the second tab 12 in the width direction W of the electrode 10 or a combination thereof FIG. 10 illustrates a schematic isometric view of a cell in an implementation of the disclosure. The electrode 10 and the separator are wound to form the cell 1, the tab 11 is disposed through stacking, and the first tab 13 is located at one side of the tab 11 away from a center of the tab 11 in a thickness direction T of the cell 1. As illustrated in FIG. 10, the thickness direction T of the cell 1 refers to a thickness direction T of a roll core formed by winding the electrode 10, and the width direction W and the length direction L mentioned above each are perpendicular to the thickness direction T.

In the disclosure, the first tab 13 is an outermost tab and located at one side of the tab away from the center of the tab in the thickness direction T of the cell 1. When the U-shaped notch 130 is recognized, winding ends.

Figure 11:
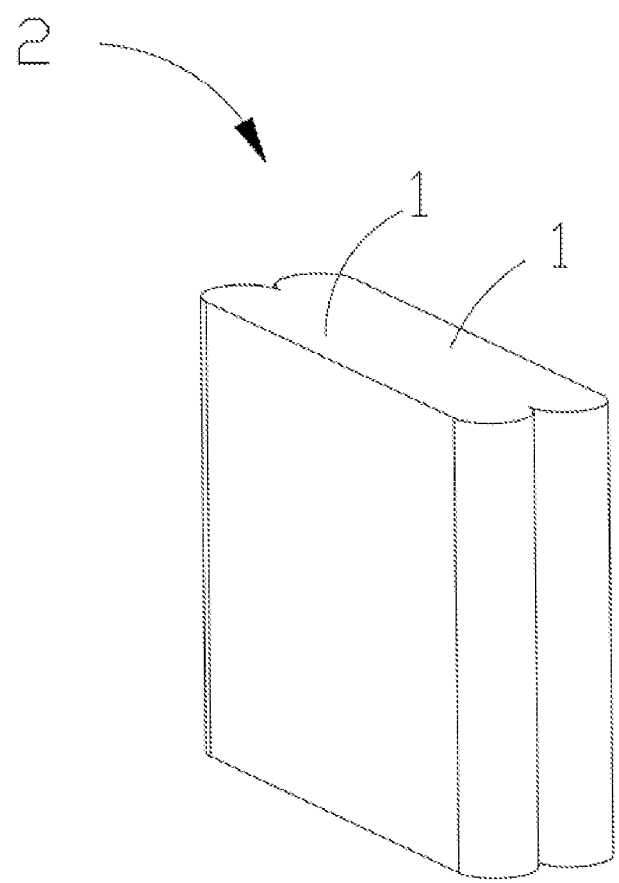
FIG. 11 is a schematic isometric view of a cell assembly in an implementation of the disclosure.

FIG. 11 illustrates a schematic structural diagram illustrating a cell assembly in an implementation of the disclosure. A cell assembly 2 includes at least two cells 1 that are stacked, where the at least two cells 1 are coupled in series or in parallel.

Coupling of the at least two cells 1 in series or in parallel can increase a capacitance.

Figure 12:
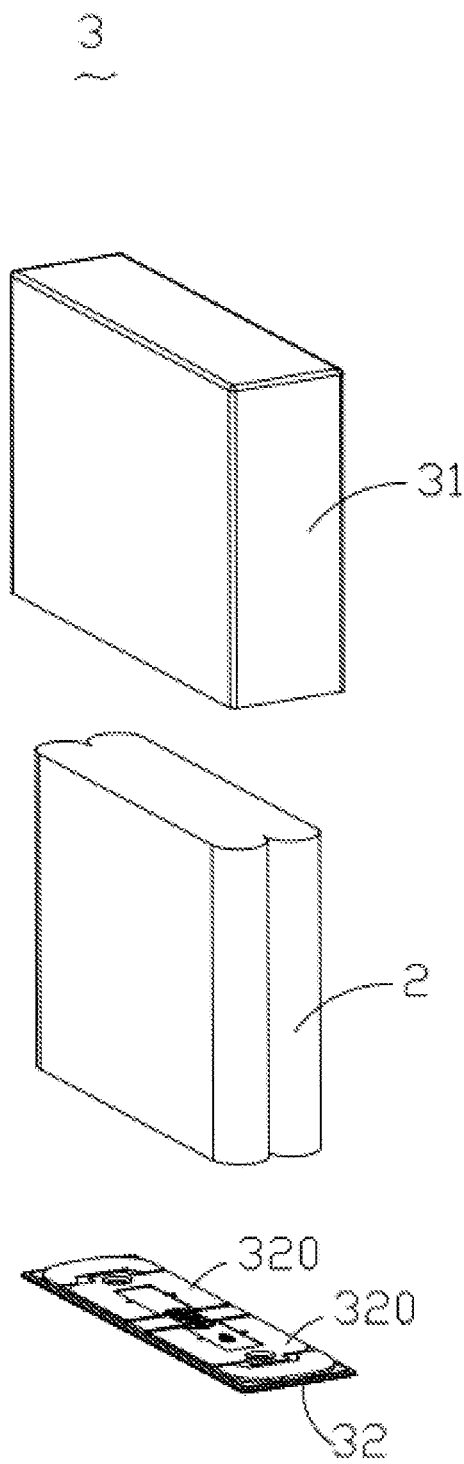
FIG. 12 is a schematic structural diagram illustrating the battery illustrated in FIG. 2 after rotating 180 degrees.
Figure 13:
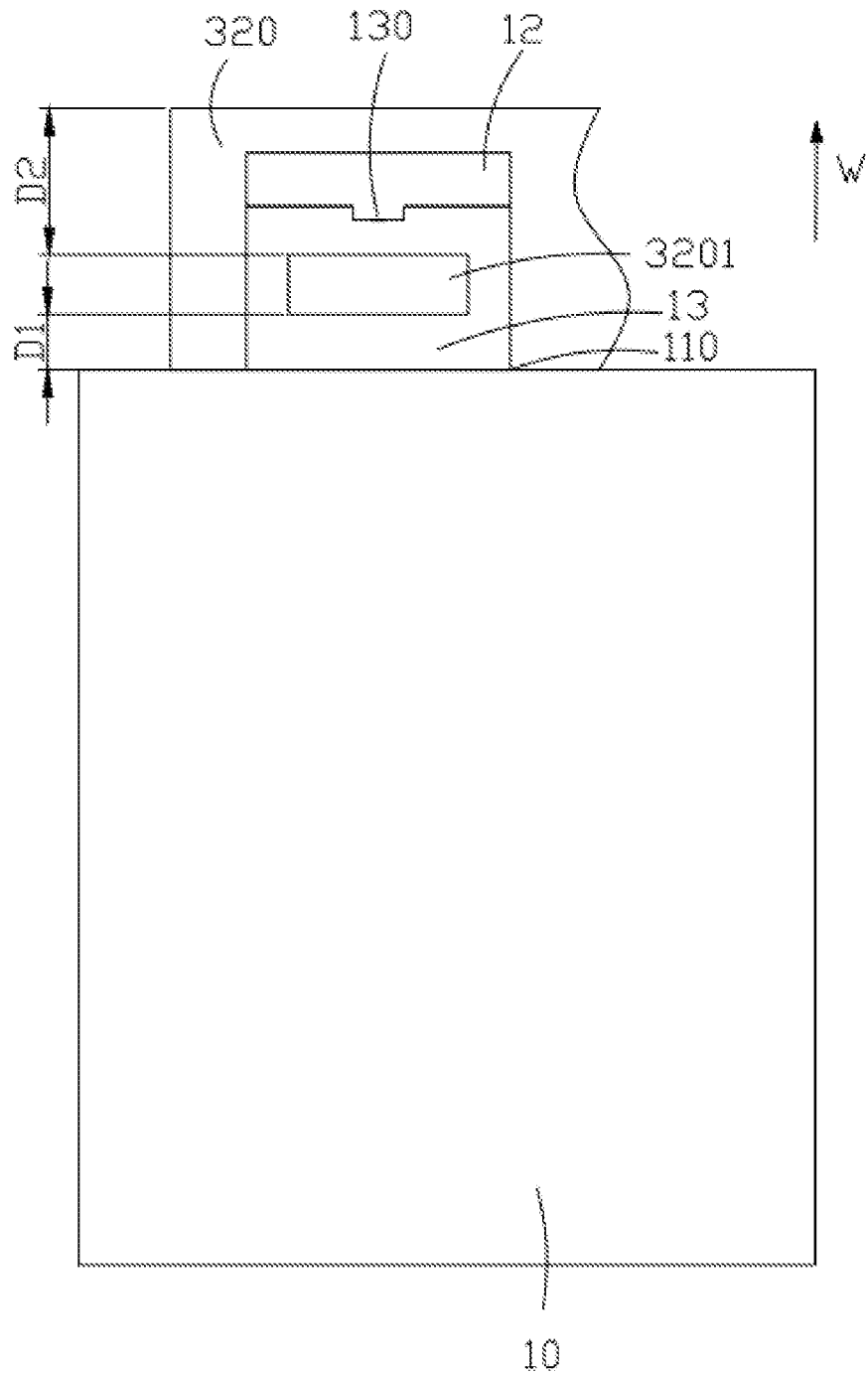
FIG. 13 is a schematic structural diagram illustrating a tab and an adaptor piece welded with the tab in an implementation of the disclosure.

As illustrated in FIG. 2, FIG. 12, and FIG. 13, the battery 3 includes a cell assembly 2, a housing 31, and a cover 32, where the cell assembly 2 is received in the housing 31, and the cover 32 is provided with an adaptor piece 320. As illustrated in FIG. 13, the tab 11 is welded with the adaptor piece 320 at a welding zone 3201, and a distance between the U-shaped notch 130 and the welding zone 3201 is greater than 0.5 mm.

Since welding of the tab 11 is ultrasonic welding with great impact, arrangement of the U-shaped notch 130 is required to avoid the welding zone 3201 on the tab 11, i.e., a distance therebetween is greater than 0.5 mm, thereby preventing the first tab 13 from being broken during welding due to the U-shaped notch 130 defined on the first tab 13.

In an implementation, as illustrated in FIG. 13 again, the tab 11 has a tab root 110 at one side of the tab 11 on the electrode 10, where a distance between the welding zone 3201 and one side of the adaptor piece 320 close to the tab root 110 is greater than or equal to 2 mm, and a distance between the welding zone 3201 and one side of the adaptor piece 320 away from the tab root 110 is greater than or equal to 10 mm. It can be understood that, the schematic diagram of FIG. 13 is not a schematic diagram of a final form of the battery 3 but is a schematic diagram illustrating a distance relation between the welding zone 3201 and the adaptor piece 320. In actual products, the electrode 10 is wound to form the roll core, multiple tabs 11 are stacked and bent from the tab root 110 to be approximately parallel to an end surface of the roll core, and the adaptor piece 320 attached to the multiple tabs 11 is welded with the multiple tabs 11.

A distance D1 between the welding zone 3201 and one side of the adaptor piece 320 close to the tab root 110 is greater than or equal to 2 mm, and a distance D2 between the welding zone 3201 and one side of the adaptor piece 320 away from the tab root 110 is greater than or equal to 10 mm. As such, the welding zone 3201 is defined at a relatively central position of the adaptor piece 320 and may not be defined at an edge of the adaptor piece 320. Thus it is possible to avoid poor contact caused by breaking the adaptor piece 320 due to vibration of ultrasonic welding, thereby improving reliability and safety of connection.

In an implementation, the adaptor piece 320 is approximately flush with the tab root 110 at an end of the adaptor piece 320 close to the tab root 110 in the width direction W, and a distance that the adaptor piece 320 extends beyond an end of the second tab 12 away from the tab root 110 in the width direction W is greater than or equal to 2 mm.

Projections of the tab 11 and the first tab 13 on a surface of the adaptor piece 320 completely fall on the adaptor piece 320, so that the adaptor piece 320 has sufficient contact areas with the tab 11, thereby further improving reliability of connection between the adaptor piece 320 and the tab 11 and the first tab 13.

In an implementation, the battery 3 is one of a lithium iron phosphate battery, a ternary lithium battery, a lithium battery, or the like.

In an implementation, the housing 31 is one of an aluminum housing, a steel housing, a stainless steel housing, or the like.

In an implementation, the battery 3 is a square-housing battery.

An electrical apparatus is further provided in the disclosure. The electrical apparatus includes at least one energy-storage device, where the energy-storage device is configured to power the electrical apparatus.

Figure 14:
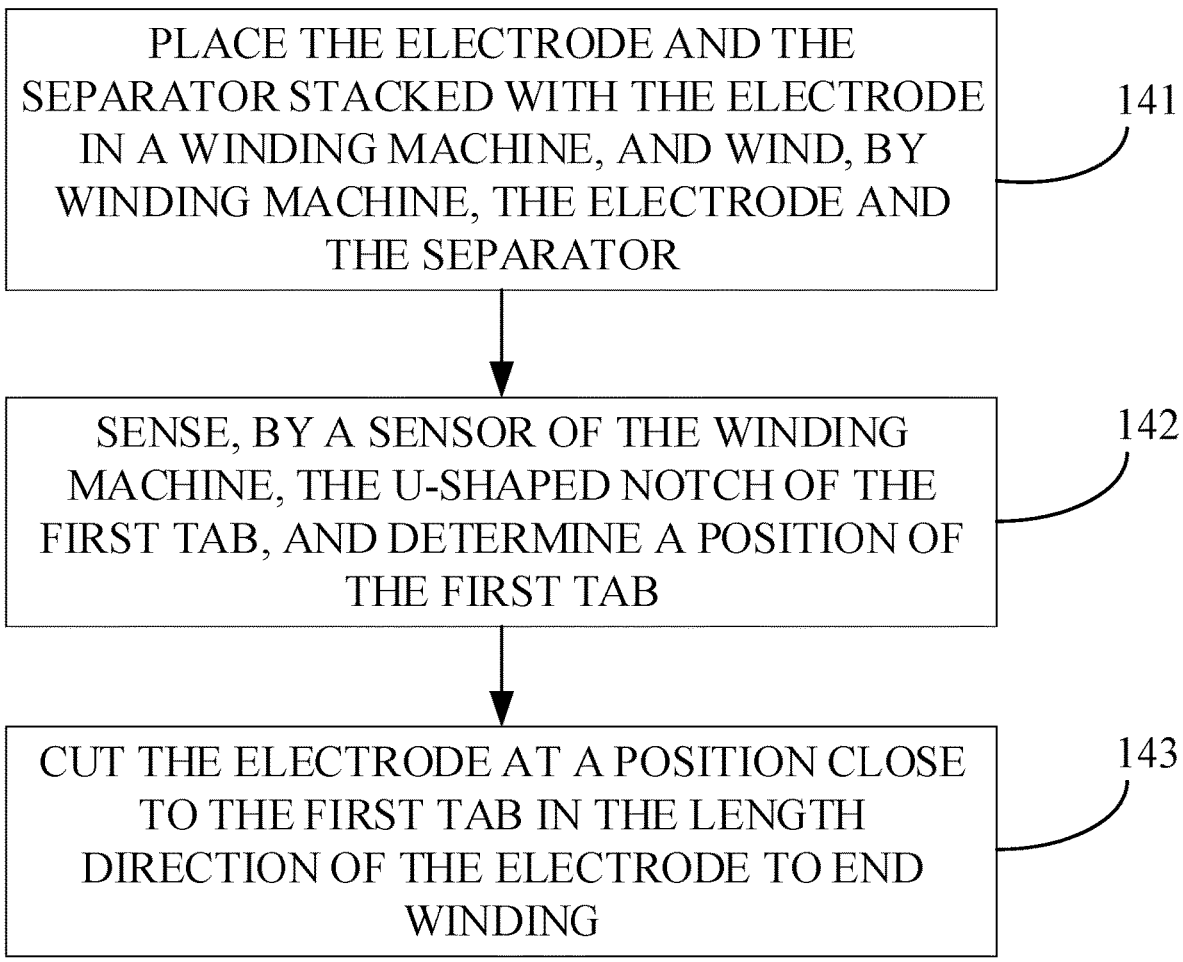
FIG. 14 is a schematic flow chart illustrating a winding method in an implementation of the disclosure.

Refer to FIG. 14, which is a schematic flow chart illustrating a winding method in an implementation of the disclosure. The winding method is for manufacturing the energy-storage device mentioned above and includes the following.

At step 141, the electrode 10 and the separator stacked with the electrode 10 are placed in a winding machine, and the electrode 10 and the separator are wound by the winding machine.

At step 142, a sensor of the winding machine senses the U-shaped notch 130 of the first tab 13 and a position of the first tab 13 is determined.

At step 143, the electrode 10 is cut at a position close to the first tab 13 in the length direction L of the electrode 10 to end winding.

In the disclosure, the first tab 13 defines the U-shaped notch 130. A winding end position of the cell 1 is marked as the U-shaped notch 130, and the winding end position is determined according to the U-shaped notch 130 in a process that the electrode 10 is wound to form the cell 1. The winding end position of the cell 1 is recognized by recognizing the U-shaped notch 130, and the electrode 10 is cut at the position close to the first tab 13 to end winding. Thus it is unnecessary to determine manually the winding end position, thereby realizing winding automation.

In the foregoing implementations, description of each implementation has its own emphasis. For the parts not described in detail in one implementation, reference may be made to related descriptions in other implementations.

It can be understood that, in one or more implementations provided in the disclosure, the implementations of the energy-storage device disclosed are merely illustrative and may also have other implementation forms.

The above are implementation manners of implementations of the disclosure, it should be noted that for those of ordinary skill in the art, without departing from the principles of implementations of the disclosure, various improvements and embellishments can also be made, where the improvements and embellishments are also considered in the scope of protection of the disclosure.

What is claimed is:

1. An energy-storage device, comprising an electrode and a separator, wherein the electrode and the separator are stacked and wound to form a cell, the electrode is connected with a tab at an end of the electrode in a width direction of the electrode, wherein the tab comprises a first tab and at least one second tab, and wherein the first tab is positioned adjacent to an end of the electrode in a length direction of the electrode, and the first tab defines a U-shaped notch for identification;

the first tab has a first end away from the electrode, the U-shaped notch extends from the first end toward the electrode, the first tab has a round that protrudes outwards and is connected between an internal side wall of the U-shaped notch and the first end, wherein the first end of the first tab has a surface that is farther away from the electrode than the U-shaped notch in the width direction of the electrode, the internal side wall has an end that is farther away from the electrode than the rest of the internal side wall in the width direction of the electrode, and the round is connected between the surface of the first end of the first tab and the end of the internal side wall of the U-shaped notch;

a ratio of a radius of the round to a width of the U-shaped notch is greater than 0.15 and less than 0.2, and a ratio of the radius of the round to a depth of the U-shaped notch is greater than 0.05 and less than 0.15;

in the width direction of the electrode, the first tab has a width less than a width of each of the at least one second tab, a ratio of the width of the first tab to the width of each of the at least one second tab is greater than 0.5 and less than 1; and the energy-storage device further comprises a housing and a cover, wherein the cell is received in the housing, the cover is provided with an adaptor piece, and the tab is stacked and welded with the adaptor piece; the tab has a tab root at one side of the tab close to the electrode, and a distance that the adaptor piece extends beyond an end of each of the at least one second tab away from the tab root in the width direction is greater than or equal to 2 mm.

2. The energy-storage device of claim 1, wherein a ratio of the width of the U-shaped notch to the depth of the U-shaped notch is equal to or greater than 1.5 and less than 2.

3. The energy-storage device of claim 1, wherein a difference between the width of the first tab and the width of each of the at least one second tab is greater than or equal to 2 mm.

4. The energy-storage device of claim 1, wherein the first tab is provided with at least one of an indentation with identification information, an adhesive member with identification information, a coating pattern with identification information, or a printing pattern with identification information.

5. The energy-storage device of claim 1, wherein the electrode and the separator are wound to form the cell, the tab is disposed through stacking, and the first tab is located at one side of the tab away from a center of the tab in a thickness direction of the cell.

6. The energy-storage device of claim 5, wherein the tab is welded with the adaptor piece at a welding zone, and wherein on the first tab, a distance between the U-shaped notch and the welding zone is greater than 0.5 mm.

7. The energy-storage device of claim 6, wherein a distance between the welding zone and one side of the adaptor piece close to the tab root is greater than or equal to 2mm, and a distance between the welding zone and one side of the adaptor piece away from the tab root is greater than or equal to 10 mm.

8. An electrical apparatus, comprising at least one energy-storage device configured to power the electrical apparatus, wherein each of the at least one energy-storage device comprises an electrode and a separator, wherein the electrode and the separator are stacked and wound to form a cell, the electrode is connected with a tab at an end of the electrode in a width direction of the electrode, wherein the tab comprises a first tab and at least one second tab, and wherein the first tab is positioned adjacent to an end of the electrode in a length direction of the electrode, and the first tab defines a U-shaped notch for identification;

the first tab has a first end away from the electrode, the U-shaped notch extends from the first end toward the electrode, the first tab has a round that protrudes outwards and is connected between an internal side wall of the U-shaped notch and the first end, wherein the first end of the first tab has a surface that is farther away from the electrode than the U-shaped notch in the width direction of the electrode, the internal side wall has an end that is farther away from the electrode than the rest of the internal side wall in the width direction of the electrode, and the round is connected between the surface of the first end of the first tab and the end of the internal side wall of the U-shaped notch;

a ratio of a radius of the round to a width of the U-shaped notch is greater than 0.15 and less than 0.2, and a ratio of the radius of the round to a depth of the U-shaped notch is greater than 0.05 and less than 0.15;

in the width direction of the electrode, the first tab has a width less than a width of each of the at least one second tab, a ratio of the width of the first tab to the width of each of the at least one second tab is greater than 0.5 and less than 1; and the energy-storage device further comprises a housing and a cover, wherein the cell is received in the housing, the cover is provided with an adaptor piece, and the tab is stacked and welded with the adaptor piece; the tab has a tab root at one side of the tab close to the electrode, and a distance that the adaptor piece extends beyond an end of each of the at least one second tab away from the tab root in the width direction is greater than or equal to 2 mm.

9. The electrical apparatus of claim 8, wherein a ratio of the width of the U-shaped notch to the depth of the U-shaped notch is equal to or greater than 1.5 and less than 2.

10. The electrical apparatus of claim 8, wherein a difference between the width of the first tab and the width of each of the at least one second tab is greater than or equal to 2 mm.

11. The electrical apparatus of claim 8, wherein the first tab is provided with at least one of an indentation with identification information, an adhesive member with identification information, a coating pattern with identification information, or a printing pattern with identification information.

12. The electrical apparatus of claim 8, wherein the electrode and the separator are wound to form the cell, the tab is disposed through stacking, and the first tab is located at one side of the tab away from a center of the tab in a thickness direction of the cell.

13. The electrical apparatus of claim 12, wherein the tab is welded with the adaptor piece at a welding zone, and wherein on the first tab, a distance between the U-shaped notch and the welding zone is greater than 0.5 mm.

14. The electrical apparatus of claim 13, wherein a distance between the welding zone and one side of the adaptor piece close to the tab root is greater than or equal to 2 mm, and a distance between the welding zone and one side of the adaptor piece away from the tab root is greater than or equal to 10 mm.

* * * * *